US012280877B2

(12) United States Patent
Arzaga Olivas (10) Patent No.: US 12,280,877 B2
(45) Date of Patent: Apr. 22, 2025

(54) SWIVEL BACKREST WITH ADJUSTABLE HEADREST

(71) Applicant: Safran Seats USA LLC, Gainesville, TX (US)

(72) Inventor: Simon Cesar Arzaga Olivas, Sanger, TX (US)

(73) Assignee: Safran Seats USA LLC, Gainesville, TX (US)

( * ) Notice: Subject to any disclaimer, the term of this patent is extended or adjusted under 35 U.S.C. 154(b) by 155 days.

(21) Appl. No.: 17/969,195

(22) Filed: Oct. 19, 2022

(65) Prior Publication Data
US 2024/0132217 A1 Apr. 25, 2024
US 2024/0228044 A9 Jul. 11, 2024

(51) Int. Cl.
*B64D 11/06* (2006.01)
*B60N 2/30* (2006.01)

(52) U.S. Cl.
CPC ........ *B64D 11/0642* (2014.12); *B60N 2/3018* (2013.01); *B64D 11/064* (2014.12)

(58) Field of Classification Search
CPC ............ B64D 11/0606; B64D 11/0639; B64D 11/064; B60N 2002/022; B60N 2/3018; B60N 2/2851
See application file for complete search history.

(56) References Cited

U.S. PATENT DOCUMENTS

| | | | |
|---|---|---|---|
| 4,536,027 A | 8/1985 | Brennan | |
| 6,199,949 B1 * | 3/2001 | DaSilva | B60N 2/2857 297/256.16 |
| 11,691,737 B2 * | 7/2023 | Miles | B64D 11/0647 297/112 |
| 2004/0036336 A1 * | 2/2004 | Veneruso | B64D 11/064 297/184.14 |
| 2011/0012386 A1 * | 1/2011 | Brncick | B60N 2/986 296/64 |
| 2014/0117731 A1 * | 5/2014 | Asli | B64D 11/0647 297/284.9 |
| 2016/0264029 A1 * | 9/2016 | Thomas | B60N 2/3036 |
| 2016/0368400 A1 * | 12/2016 | Taylor | B60N 2/2875 |
| 2017/0021930 A1 * | 1/2017 | Henshaw | B64D 11/064 |
| 2017/0073076 A1 | 3/2017 | Ozaki et al. | |

(Continued)

FOREIGN PATENT DOCUMENTS

| | | | |
|---|---|---|---|
| CA | 2281494 A1 | 8/1998 | |
| CA | 2976994 A1 * | 4/2018 | B60N 2/90 |

(Continued)

OTHER PUBLICATIONS

International Application No. PCT/US2023/034877, International Search Report and Written Opinion mailed on Jan. 26, 2024, 13 pages.

*Primary Examiner* — Timothy J Brindley
(74) *Attorney, Agent, or Firm* — Kilpatrick Townsend & Stockton LLP (57) ABSTRACT

A seat back assembly for a passenger seat, such as but not limited to an aircraft passenger seat, includes a seat back and a backrest assembly. The backrest assembly includes a backrest and a headrest. The backrest is movable relative to the seat back between a stowed position and a deployed position. The headrest is supported on the backrest and is movable relative to the backrest between a stowed position and a deployed position.

19 Claims, 7 Drawing Sheets

(56) References Cited

U.S. PATENT DOCUMENTS

| | | | |
|---|---|---|---|
| 2017/0106772 A1* | 4/2017 | Williams | ............. B60N 2/2851 |
| 2021/0339869 A1 | 11/2021 | Miles et al. | |
| 2023/0312095 A1* | 10/2023 | Escobar | ............ B64D 11/0606 |
| | | | 244/118.6 |

FOREIGN PATENT DOCUMENTS

| | | | | |
|---|---|---|---|---|
| CA | 3058153 A1 * | 4/2020 | ........... A47C 1/0342 |
| CN | 117566107 A * | 2/2024 | |
| DE | 10317036 B3 * | 6/2004 | ........... B60N 2/4882 |
| DE | 102005009750 A1 * | 9/2006 | ............. B64D 11/00 |
| DE | 102017210159 A1 * | 9/2018 | |
| EP | 3981664 A1 * | 4/2022 | ............. B60J 1/2047 |
| EP | 4079639 A1 * | 10/2022 | ........... B60N 2/3018 |
| FR | 2967623 A1 * | 5/2012 | ........... B60N 2/3018 |
| FR | 3115740 A1 * | 5/2022 | ........... B60N 2/6009 |
| GB | 2442386 A * | 4/2008 | ............ B60N 2/806 |
| GB | 2476385 A | 6/2011 | |
| WO | 03004355 A2 | 1/2003 | |
| WO | WO-2005035302 A2 * | 4/2005 | ........ B60N 2/01508 |
| WO | WO-2007072045 A2 * | 6/2007 | ............ B64D 11/06 |
| WO | 2021069883 A1 | 4/2021 | |
| WO | 2022046095 A1 | 3/2022 | |
| WO | WO-2023046907 A1 * | 3/2023 | ............... B60N 2/01 |

* cited by examiner

SWIVEL BACKREST WITH ADJUSTABLE HEADREST

FIELD OF THE INVENTION

The field of the invention relates to passenger seats for passenger vehicles such as aircraft, and more particularly to passenger seats with adjustable backrests.

BACKGROUND

Passenger vehicles, such as aircraft, buses, trains, ships, and automobiles, often include one or more passenger seat assemblies in which passengers may be seated and otherwise use during travel. A passenger seat assembly may include a seat back and a seat base. Traditional passenger seat assemblies offer limited privacy to a passenger using the passenger seat.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, A seat back assembly for a passenger seat includes a seat back and a backrest assembly. The backrest assembly includes a backrest and a headrest. The backrest is movable relative to the seat back between a stowed position and a deployed position. The headrest is supported on the backrest and is movable relative to the backrest.

In some embodiments, the backrest is pivotable about a pivot axis relative to the seat back extending in a first direction.

In certain embodiments, the headrest is wherein the headrest is vertically movable relative to the backrest, foldable relative to the backrest, and/or tiltable relative to the backrest.

In various embodiments, a width of the backrest is substantially the same as a width of the seat back.

In certain embodiments, the backrest includes a frame and a cushion supported on the frame. Optionally, the cushion extends in a vertical direction below the frame of the backrest.

In some cases, the backrest includes a support surface, and, in the stowed position of the backrest, the support surface faces in a forward direction, and, in the deployed position of the backrest, the support surface faces in a lateral direction perpendicular to the forward direction.

In various embodiments, the headrest is movable relative to the backrest independently from movement of the backrest relative to the seat back.

In certain embodiments, in a stowed position of the headrest, the headrest defines a minimum height of the seat back assembly, and, in a deployed position of the headrest, the headrest defines a maximum height of the seat back assembly.

The seat back assembly optionally may include a privacy panel that is movable relative to the seat back between a stowed position and a deployed position. The privacy panel may be movable between the stowed position and deployed position of the privacy panel when the backrest is in the deployed position of the backrest. Optionally, in the deployed position of the privacy panel, the privacy panel extends forward relative to the seat back.

Optionally, the privacy panel and the backrest are each pivotably attached to the seat back at opposing sides of the seat back.

According to certain embodiments of the present invention, a passenger seat includes the seat back assembly and a seat base. In various embodiments, the seat base includes a first lateral side extending in a forward and aft direction and a second lateral side extending in the forward and aft direction, and, in the deployed position of the backrest, the backrest extends along the first lateral side or the second lateral side.

In some embodiments, in the stowed position of the backrest, the backrest extends between the first lateral side and the second lateral side.

In various embodiments, the headrest is movable between a stowed position and a deployed position when the backrest is in the stowed position of the backrest and when the backrest is in the deployed position of the backrest.

According to certain embodiments of the present invention, a seat back assembly for a passenger seat includes a seat back and a backrest assembly. The seat back includes a first lateral side and a second lateral side. The backrest assembly includes a backrest and a headrest. The backrest may be pivotably connected to the first lateral side of the seat back, and the headrest may be attached to the backrest and movable relative to the backrest.

In some embodiments, the backrest is pivotable between a stowed position and a deployed position, and, in the stowed position of the backrest, the backrest extends between the first lateral side and the second lateral side, and, in the deployed position of the backrest, the backrest extends in a forward direction relative to the first lateral side or the second lateral side.

According to certain embodiments of the present invention, a seat back assembly for a passenger seat includes a seat back and a backrest assembly. The backrest assembly includes a backrest, a privacy panel, and a headrest. In certain embodiments, the backrest and the privacy panel are each configured to swivel relative to the seat back. The headrest may be movable relative to the backrest.

The privacy panel and the backrest may be configured to independently swivel relative to the seat back.

In some embodiments, the backrest includes a frame and a cushion supported on the frame, and the headrest is attached to the frame of the backrest such that the headrest is movable between a stowed position and a deployed position.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide backrest assemblies for passenger seats. While the backrest assemblies are discussed for use with aircraft seats, they are by no means so limited. Rather, embodiments of the backrest assemblies may be used in passenger seats or other seats of any type or otherwise as desired.

FIGS. 1-7 illustrates an example of a passenger seat assembly 100 with a seat back assembly 102 according to embodiments of the present invention. In general, the passenger seat assembly 100 includes a seat base 104 and the seat back assembly 102 that is supported relative to the seat base 104. The number of seat back assemblies 102 should not be considered limiting on the current disclosure. In various examples, the number of seat back assemblies 102 corresponds with the number of passenger seats that the passenger seat assembly is capable of carrying, and each seat back assembly 102 and the corresponding portion of the seat base 104 define a particular passenger seat 106 of the passenger seat assembly 100. In the example of FIGS. 1-7, the passenger seat assembly 100 can carry one passenger and accordingly has one seat back assembly 102 and one passenger seat 106. However, in other examples, the passenger seat assembly 100 may be capable of carrying any desired number of passengers, such as two passengers, three passengers, four passengers, or any other desired number of passengers. In these examples, the passenger seat assembly 100 can likewise have any desired number of corresponding seat back assemblies 102 and passenger seats 106.

The seat base 104 of the passenger seat assembly 100 generally includes a first lateral side 105 and a second lateral side 107, each extending in a forward and aft direction of the passenger seat. The seat base 104 may include seat legs and/or another frame component as desired. Each seat back assembly 102 is connected to the seat base 104, and is often pivotable relative to the seat base 104 such that the seat back assembly 102 can be positioned in various positions such as a taxi-takeoff-landing (TTL) position, a reclined position, etc. In some cases, other components of the passenger seat assembly 100, such as a tray table, in-flight entertainment equipment, cup holders, literature pockets, etc. may be supported on the seat back assembly 102. In various embodiments, the passenger seat assembly 100 includes one or more armrests that optionally may be pivotable relative to the seat base 104 and/or the seat back assembly 102. Each seat back assembly 102 and the corresponding portion of the seat base 104 together at least partially define a living space for the passenger when used (i.e., the space that the passenger may occupy and use while sitting in a particular passenger seat).

In various embodiments, the seat back assembly 102 includes a seat back 108 and a backrest assembly 110. As discussed in detail below, the backrest assembly 110 includes a backrest 112 and a headrest 114. In certain embodiments, the backrest 112 and the headrest 114 are movable relative to the seat back 108. In various embodiments, the headrest 114 is movable relative to the backrest 112.

The seat back 108 generally includes a first lateral side 116 and a second lateral side 118 opposite from the first lateral side 116. A distance from the first lateral side 116 to the second lateral side 118 is a width of the seat back 108. In certain embodiments, the seat back 108 includes a frame or support structure 120. Cushioning (not illustrated for clarity of the figure) may also be provided on the seat back 108. In certain embodiments, and as discussed in detail below, depending on a position of the backrest assembly 110 relative to the seat back 108, a passenger may engage a forward side 122 of the seat back 108 while he or she is sitting in the passenger seat 106.

Figure 4:
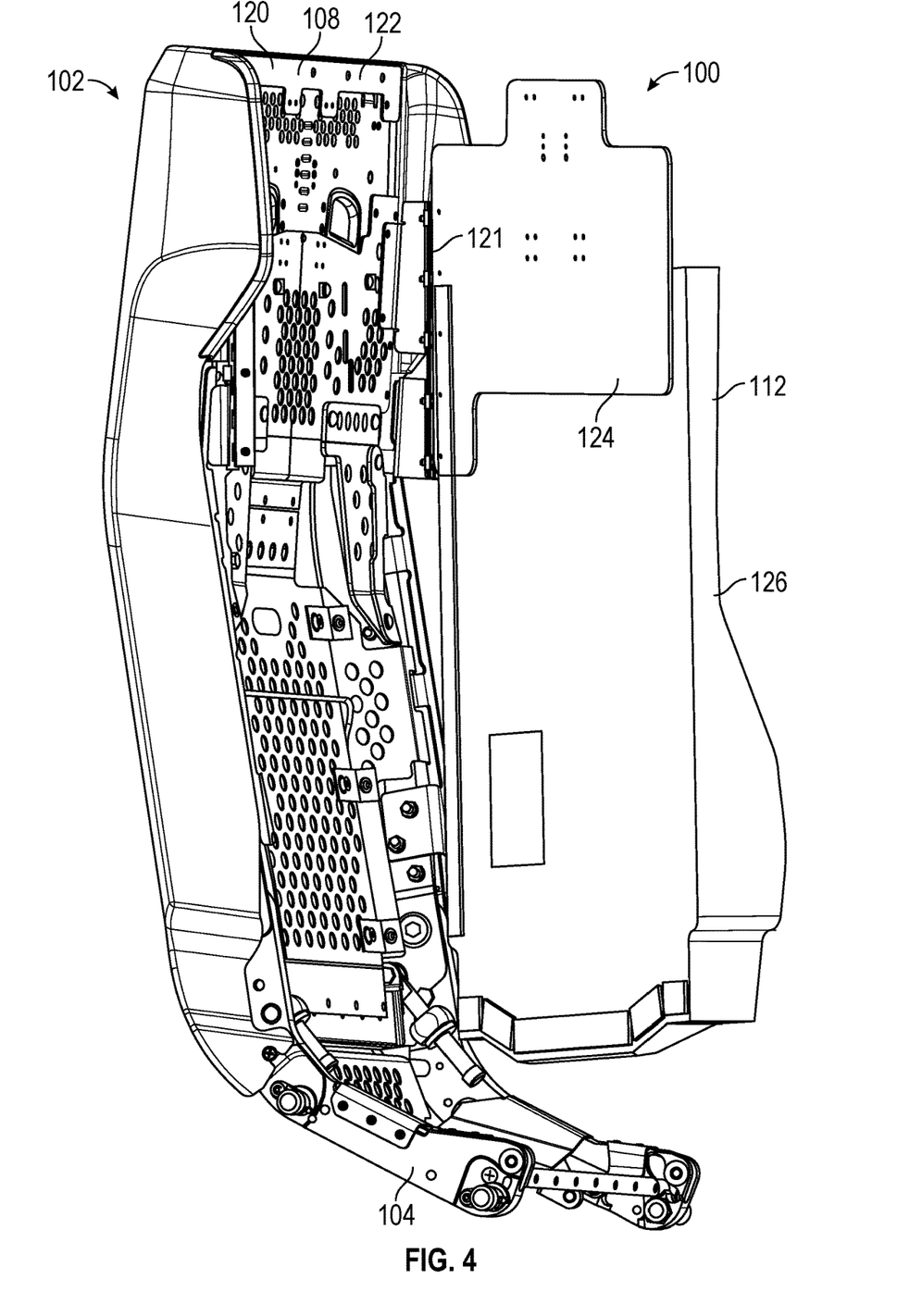
FIG. 4 is a perspective view of the passenger seat of FIG. 1 with the backrest of the backrest assembly in a partially deployed position.
Figure 6:
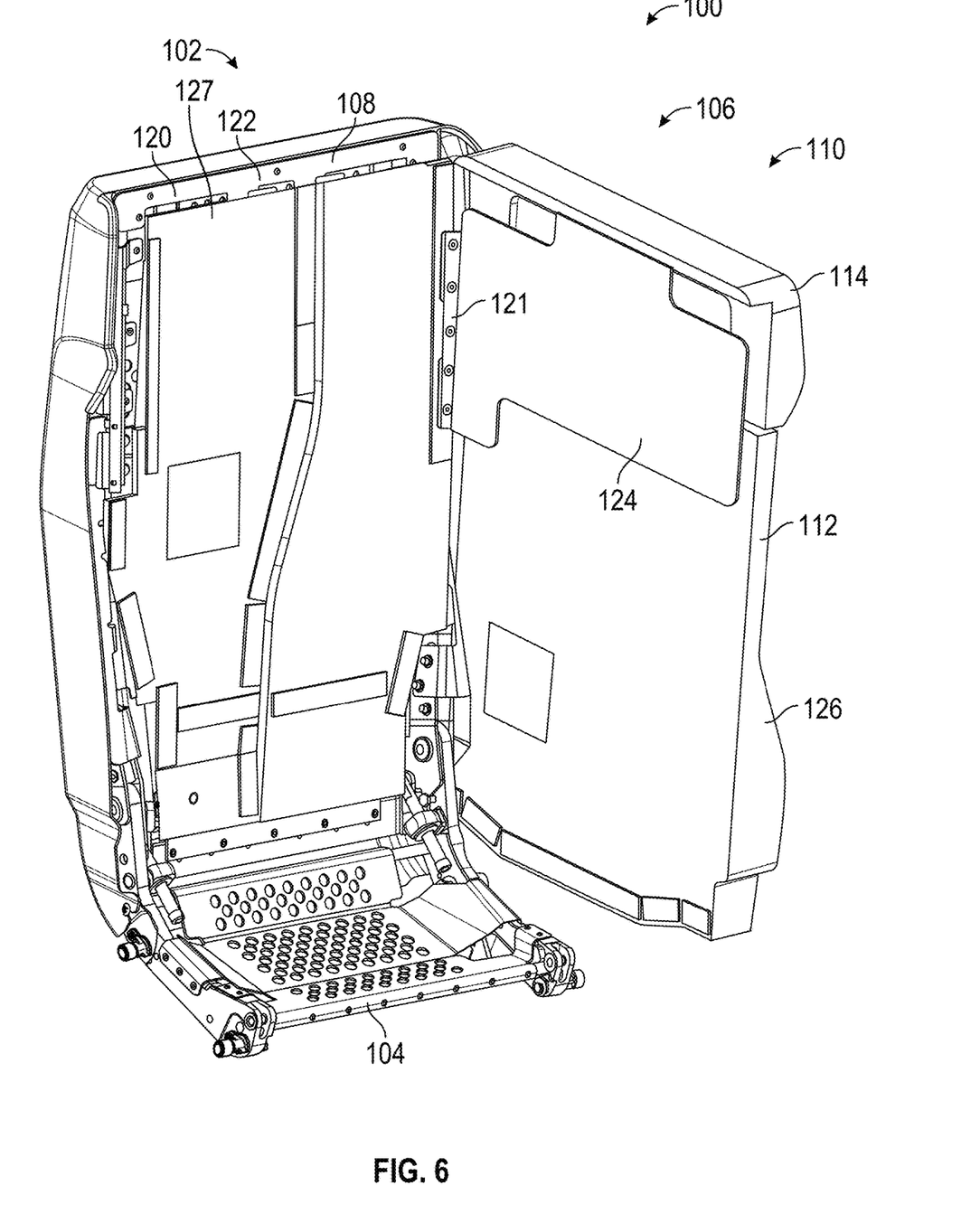
FIG. 6 is a perspective view of the passenger seat of FIG. 1 with the backrest of the backrest assembly in a deployed position and the headrest of the backrest assembly in a stowed position.
Figure 7:
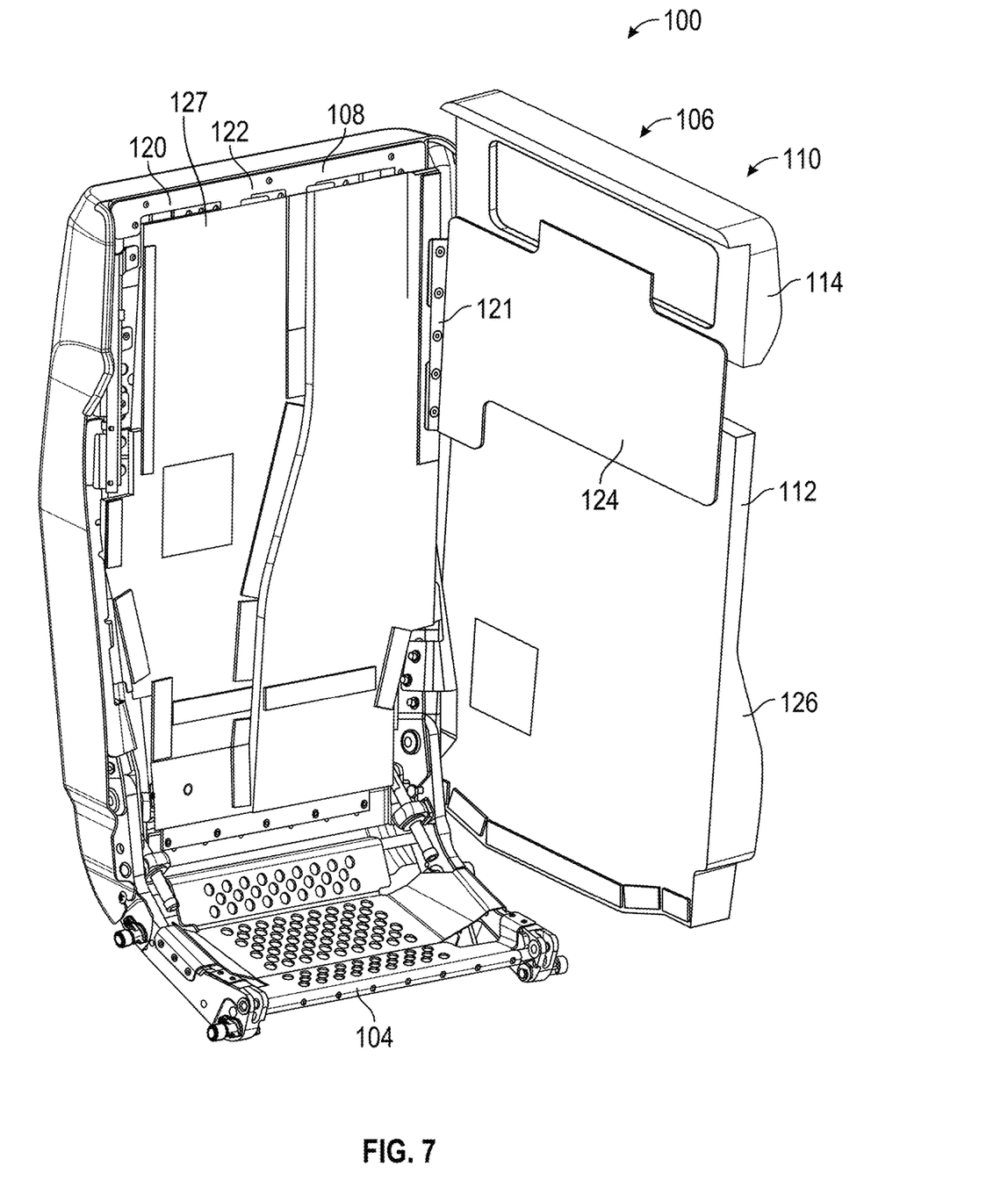
FIG. 7 is a perspective view of the passenger seat of FIG. 1 with the backrest of the backrest assembly in the deployed position and the headrest of the backrest assembly in the deployed position.

As mentioned, the backrest assembly 110 includes the backrest 112 and the headrest 114. As best illustrated in FIGS. 4, 6, and 7, the backrest 112 includes a frame or support structure 124. In certain embodiments, and as discussed in detail below, the support structure 124 may support a cushioning member 126 of the backrest 112 as well as the headrest 114.

The support structure 124 is connected to the support structure 120 of the seat back 108 adjacent to the first lateral side 116 or the second lateral side 118 of the seat back 108. In the embodiment illustrated, the support structure 124 is connected adjacent to the second lateral side 118. Referring to FIG. 4, in some embodiments, the support structure 124 is pivotably connected to the support structure 120 of the seat back 106 using various devices or mechanisms as desired such that the backrest 112 is movable relative to the backrest 112. In the embodiment of FIGS. 1-7, a single pivot point or connection 121 hingedly connects the backrest 112 with the seat back 108 such that the backrest 112 may swivel relative to the seat back 108 about a pivot axis extending in a first direction. However, in other embodiments, any type and/or any number of pivot points or connections may connect the backrest 112 with the seat back 108, such as but not limited to two pivot points or connections, three pivot points or connections, etc.

The cushioning member 126 generally includes a support surface 128. The cushioning member 126 may be various types of cushioning members as desired. The cushioning member 126 of the backrest 112 may define a width of the backrest 112. Optionally, the width of the backrest 112 may be substantially the same as the width of the seat back 108. Optionally, the cushioning member 126 extends in a vertical direction below the support structure 124 of the backrest 112 such that at least a portion of the cushioning member 126 is uncovered by the support structure 124. However, the particular cushioning member 126 illustrated should not be considered limiting, and in other embodiments, other types of cushioning members with other shapes and/or profiles may be utilized as desired. In certain embodiments, the backrest assemblies 110 described herein may be modular and allow for easy installation and/or replacement of the cushioning member 126 as desired, thereby providing improved customization and tailoring of the passenger seat 106 to have a desired cushioning member 126.

In various embodiments, the backrest 112 is movable between a stowed position (see, e.g., FIGS. 1 and 2) and a deployed position (see, e.g., FIGS. 4, 6, and 7) relative to the seat back 108. In the stowed position of the backrest 112, the support surface 128 faces in the forward direction, and the cushioning member 126 may cover the forward side 122 of the seat back 106. In various embodiments, in the stowed position of the backrest 112, the backrest 112 extends between the first lateral side 116 and the second lateral side 118 of the seat back 108. The passenger using the passenger seat 106 may engage the support surface 128 of the backrest 112 when the backrest 112 is in the stowed position.

In certain embodiments, in the deployed position of the backrest 112, the support surface 128 of the backrest 112 faces in a lateral direction that is generally perpendicular to the forward direction. A passenger of the passenger seat 106 may engage the forward side 122 of the seat back 106 when the backrest 112 is in the deployed position. In certain embodiments, in the deployed position of the backrest 112, the backrest extends in the forward and aft direction and along the first lateral side 105 or the second lateral side 107 of the seat base 104. In the deployed position of the backrest 112, the deployed backrest 112 may offer privacy to the passenger seat 106 by creating a barrier along a side of the passenger seat 106 and in the forward and aft direction.

The particular headrest 114 illustrated should not be considered limiting, and in various embodiments, various types of headrests that are movable relative to the backrest 112. As a non-limiting example, while the headrest 114 is illustrated as generally a single component, in other embodiments, the headrest 114 may include a plurality of components such as but not limited to a headrest with side wings, a headrest with a head portion and a neck support portion, combinations thereof, etc. In embodiments where the headrest 114 includes a plurality of components, each component is optionally movable relative to the backrest 112 (examples of movement are discussed in detail below), although they need not be in other embodiments. In embodiments where the headrest 114 includes a plurality of movable components, the movable components may be movable independently from each other and/or in conjunction with one or more other components of the headrest 114. As an example, a headrest 114 with two side wings may include the side wings movable together or independently. Moreover, the type of movement of one component of the headrest need not be the same as the type of movement as another component of the headrest. As a non-limiting example, the headrest with the head portion and the neck support portion may include the head portion that is tiltable relative to the backrest and the neck portion that is foldable or movable between a stowed position (e.g., extending vertically) and a deployed position (e.g., extending forward. The above examples are for illustrative purposes only and should not be considered limiting.

The headrest 114 of the backrest assembly 110 may be partially supported on the support structure 124 of the backrest 112. In certain embodiments, the headrest 114 is supported on the support structure 124 using various devices and/or mechanisms such that the headrest 114 is movable relative to the backrest 112. Non-limiting examples of movement of the headrest 114 relative to the backrest 112 include linear (e.g., vertical) movement between a stowed position and a deployed position, moving of side wings or ears of the headrest 114 between a stowed (e.g., folded) and deployed (e.g., unfolded) position, and/or tilting of the headrest 114 upwards and/or downwards. In the embodiment illustrated, the headrest 114 is linearly movable relative to the backrest 112 between a stowed position (see, e.g., FIGS. 1 and 6) and a deployed position (see, e.g., FIGS. 2, 5, and 7). In the embodiment illustrated, in the stowed position of the headrest 114, the headrest 114 defines a minimum height of the seat back assembly 102, and, in the deployed position of the headrest 114, the headrest 114 defines a maximum height of the seat back assembly 102. In the embodiment illustrated, the headrest 114 is linearly movable using rails 130; however, in other embodiments, other devices or mechanisms may be utilized such that the headrest 114 is linearly movable relative to the backrest 112. As mentioned, in other embodiments, the headrest 114 may be movable in addition to or in place of being linear movable, such as tiltable, foldable, etc.

Figure 1:
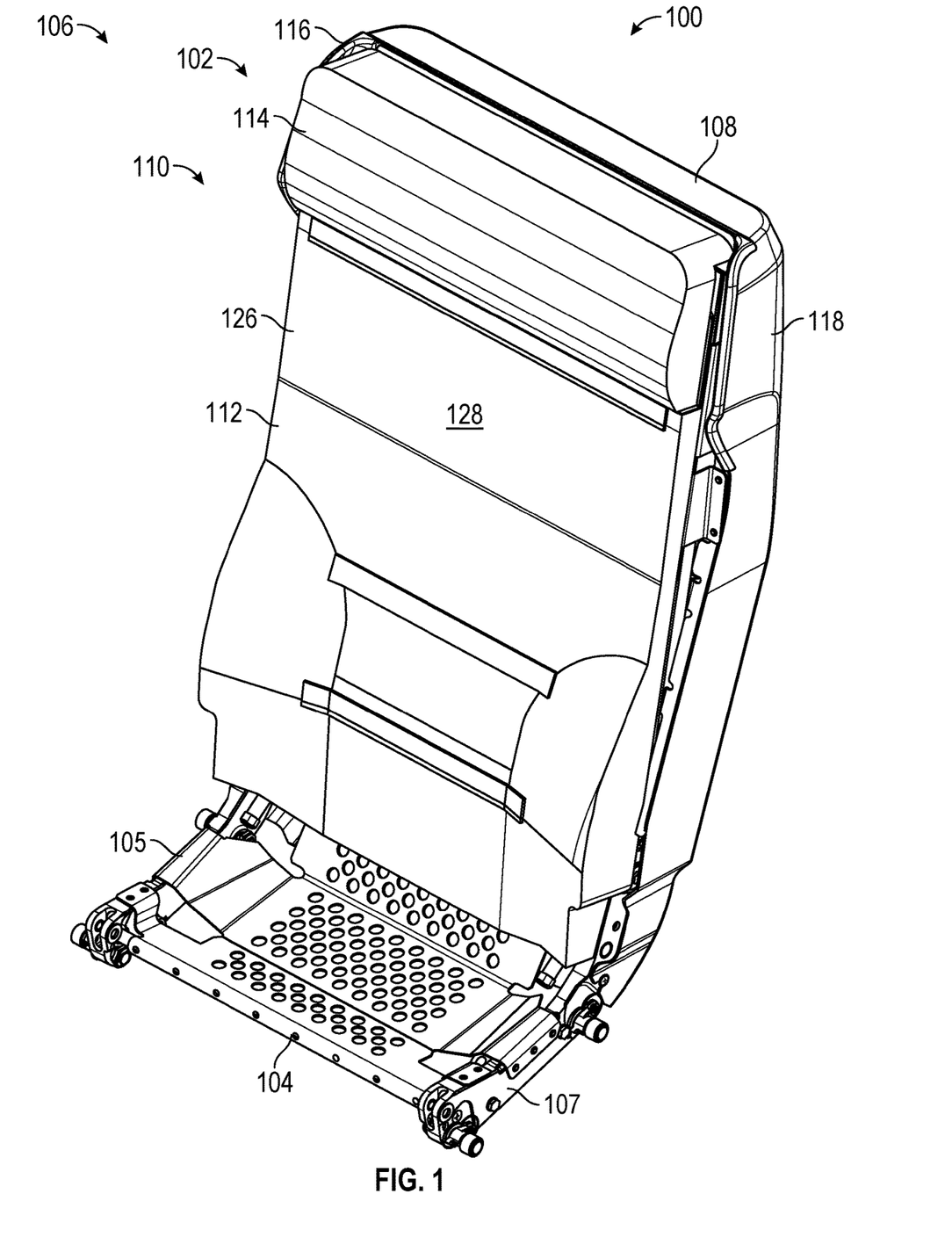
FIG. 1 is a perspective view a portion of a passenger seat with a backrest assembly according to embodiments of the present invention.
Figure 2:
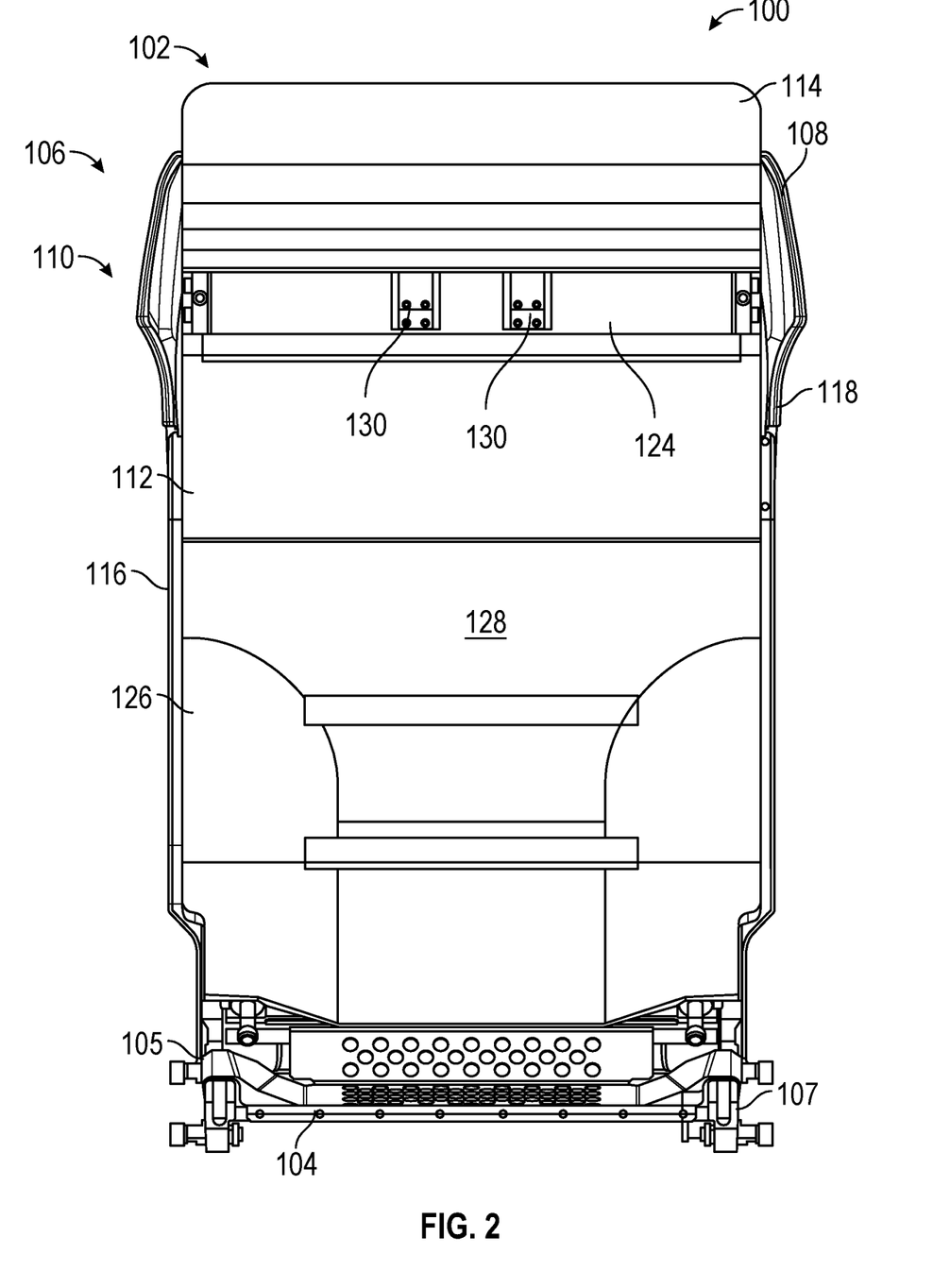
FIG. 2 is a front view of a passenger seat of FIG. 1.
Figure 3:
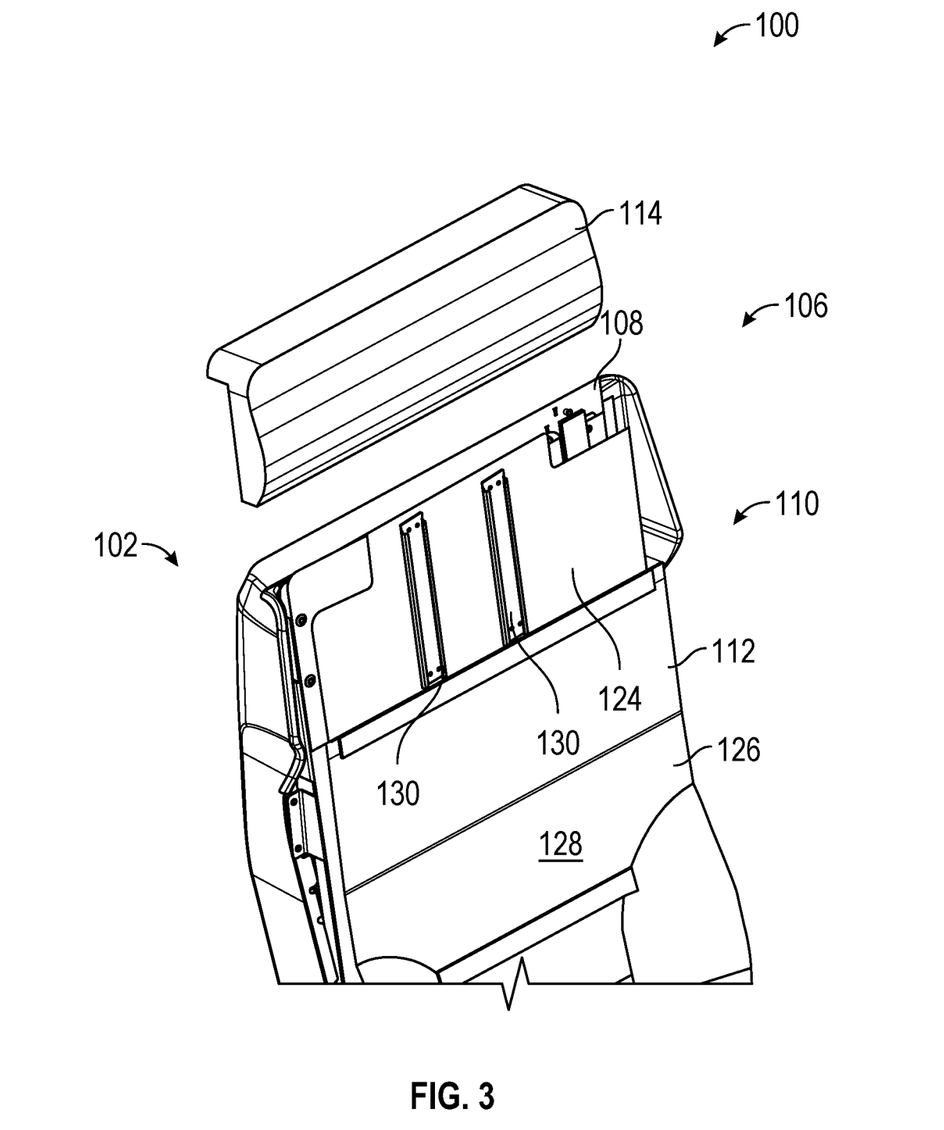
FIG. 3 is a perspective view of the passenger seat of FIG. 1 with a headrest of the backrest assembly removed from a backrest of the backrest assembly.
Figure 5:
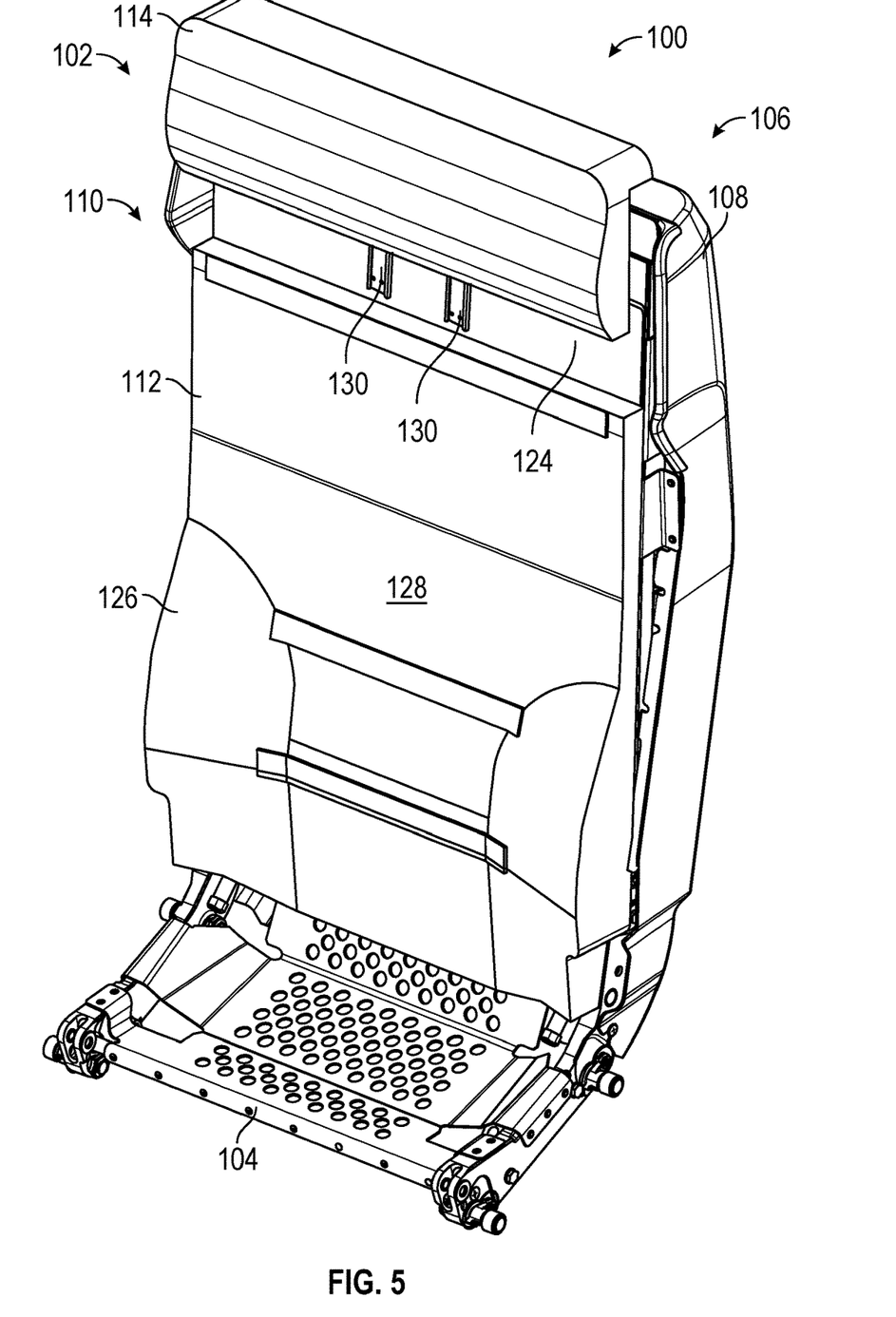
FIG. 5 is a perspective view of the passenger seat of FIG. 1 with the backrest of the backrest assembly in a stowed position and the headrest of the backrest assembly in a deployed position.

In various embodiments, the headrest 114 is movable relative to the backrest 112 independent from movement of the backrest 112 relative to the seat back 106. As a non-limiting example, FIG. 1 illustrates both the headrest 114 and the backrest 112 in stowed positions; FIGS. 2 and 5 illustrate the headrest 114 in the linearly deployed position and the backrest 112 in the stowed position; FIG. 6 illustrates the headrest 114 in the linearly stowed position and the backrest 112 in the deployed position; and FIG. 7 illustrates both the headrest 114 and the backrest 112 in deployed positions. In other words, the headrest 114 may be movable (e.g., between a stowed position and a deployed position) when the backrest 112 is in the stowed position of the backrest 112 and when the backrest 112 is in the deployed position of the backrest 112. In certain embodiments, the headrest 114 and the backrest 112 both in deployed positions may provide additional privacy to a passenger using the passenger seat 106. Independent movement of the headrest 114 relative to the backrest 112 may also provide increased upper torso support to a passenger and/or may provide improved comfort to the passenger of the passenger seat 106 by allowing for adjustment as desired.

Optionally, the seat back assembly 102 may additionally include a privacy panel 127 for providing additional privacy to the passenger of the passenger seat 106. When included, the privacy panel 127 may be pivotably or hingedly connected to a side of the seat back 108 opposite from the backrest assembly 110. As a non-limiting example, the backrest assembly 110 may be connected to the second lateral side 118 of the seat back 108 while the privacy panel 127 may be connected to the first lateral side 116. In various embodiments, similar to the backrest assembly 110, the privacy panel 127 may be movable between a stowed position and a deployed position relative to the seat back 108. In the deployed position, similar to the backrest assembly 110, the privacy panel 127 may extend forward relative to the seat back 108 and along the lateral side of the seat base 104 opposite from the backrest assembly 110. In the stowed position, the privacy panel 127 may extend across the width of the seat back 108. Optionally, a passenger may engage the privacy panel 127 when the privacy panel is in the stowed position and the backrest assembly 110 is in the deployed position. When both the privacy panel 127 and the backrest assembly 110 are in the stowed positions, the privacy panel 127 may be sandwiched between the forward side 122 of the seat back 106 and the backrest assembly 110. In certain embodiments, the privacy panel 127 is movable relative to the seat back 108 between its stowed and deployed positions independent from movement of the backrest assembly 110 relative to the seat back 108.

A collection of exemplary embodiments are provided below, including at least some explicitly enumerated as "Examples" providing additional description of a variety of example embodiments in accordance with the concepts described herein. These examples are not meant to be mutually exclusive, exhaustive, or restrictive; and the disclosure not limited to these examples but rather encompasses all possible modifications and variations within the scope of the issued claims and their equivalents.

Example A. A seat back assembly for a passenger seat, the seat back assembly comprising: a seat back; and a backrest assembly comprising a backrest and a headrest, wherein the backrest is movable relative to the seat back between a stowed position and a deployed position, and wherein the headrest is supported on the backrest and is movable relative to the backrest.

Example B. The seat back assembly of any of any preceding or subsequent examples or combination of examples, wherein the backrest is pivotable about a pivot axis relative to the seat back extending in a first direction.

Example C. The seat back assembly of any of any preceding or subsequent examples or combination of examples, wherein the headrest is vertically movable relative to the backrest, foldable relative to the backrest, and tiltable relative to the backrest.

Example D. The seat back assembly of any of any preceding or subsequent examples or combination of examples, wherein a width of the backrest is substantially the same as a width of the seat back.

Example E. The seat back assembly of any of any preceding or subsequent examples or combination of examples, wherein the backrest comprises a frame and a cushion supported on the frame.

Example F. The seat back assembly of any of any preceding or subsequent examples or combination of examples, wherein the cushion extends in a vertical direction below the frame of the backrest.

Example G. The seat back assembly of any of any preceding or subsequent examples or combination of examples, wherein the backrest comprises a support surface, wherein, in the stowed position of the backrest, the support surface faces in a forward direction, and wherein, in the deployed position of the backrest, the support surface faces in a lateral direction perpendicular to the forward direction.

Example H. The seat back assembly of any of any preceding or subsequent examples or combination of examples, wherein the headrest is movable relative to the backrest independently from movement of the backrest relative to the seat back.

Example I. The seat back assembly of any of any preceding or subsequent examples or combination of examples, wherein the headrest is movable between a stowed position and a deployed position, wherein, in the stowed position of the headrest, the headrest defines a minimum height of the seat back assembly, and wherein, in the deployed position of the headrest, the headrest defines a maximum height of the seat back assembly.

Example J. The seat back assembly of any of any preceding or subsequent examples or combination of examples, further comprising a privacy panel movable relative to the seat back between a stowed position and a deployed position, and wherein the privacy panel is movable between the stowed position and deployed position of the privacy panel when the backrest is in the deployed position of the backrest.

Example K. The seat back assembly of any of any preceding or subsequent examples or combination of examples, wherein, in the deployed position of the privacy panel, the privacy panel extends forward relative to the seat back.

Example L. The seat back assembly of any of any preceding or subsequent examples or combination of examples, wherein the privacy panel and the backrest are each pivotably attached to the seat back at opposing sides of the seat back.

Example M. A passenger seat comprising the seat back assembly of claim 1 and a seat base, wherein the seat base comprises a first lateral side extending in a forward and aft direction and a second lateral side extending in the forward and aft direction, and wherein, in the deployed position of the backrest, the backrest extends along the first lateral side or the second lateral side.

Example N. The passenger seat of any of any preceding or subsequent examples or combination of examples, wherein, in the stowed position of the backrest, the backrest extends between the first lateral side and the second lateral side.

Example O. The passenger seat of any of any preceding or subsequent examples or combination of examples, wherein the headrest is movable between a stowed position and a deployed position when the backrest is in the stowed position of the backrest and when the backrest is in the deployed position of the backrest.

Example P. A seat back assembly for a passenger seat, the seat back assembly comprising: a seat back comprising a first lateral side and a second lateral side; and a backrest assembly comprising a backrest and a headrest, wherein the backrest is pivotably connected to the first lateral side of the seat back, and wherein the headrest attached to the backrest and movable relative to the backrest.

Example Q. The seat back assembly of any of any preceding or subsequent examples or combination of examples, wherein the backrest is pivotable between a stowed position and a deployed position, wherein, in the stowed position of the backrest, the backrest extends between the first lateral side and the second lateral side, and wherein, in the deployed position of the backrest, the backrest extends in a forward direction relative to the first lateral side or the second lateral side.

Example R. A seat back assembly for a passenger seat, the seat back assembly comprising: a seat back; and a backrest assembly comprising a backrest, a privacy panel, and a headrest, wherein the backrest and the privacy panel are each configured to swivel relative to the seat back, and wherein the headrest is movable relative to the backrest.

Example S. The seat back assembly of any of any preceding or subsequent examples or combination of examples, wherein the privacy panel and the backrest are configured to independently swivel relative to the seat back.

Example T. The seat back assembly of any of any preceding or subsequent examples or combination of examples, wherein the backrest comprises a frame and a cushion supported on the frame, and wherein the headrest is attached to the frame of the backrest such that the headrest is movable relative to the backrest.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising:
a seat base; and
a seat back assembly supported on the seat base, the seat back assembly pivotable relative to the seat base about an axis extending in a first direction, the seat back assembly comprising:
a seat back; and
a backrest assembly supported on the seat back and comprising a backrest and a headrest, wherein the backrest is pivotable about an axis extending in a second direction perpendicular to the first direction and relative to the seat back between a stowed position and a deployed, and wherein the headrest is supported on the backrest and is movable relative to the backrest.

2. The passenger seat of claim 1, wherein the backrest is pivotable about a pivot axis relative to the seat back extending in a first direction.

3. The passenger seat of claim 1, wherein the headrest is vertically movable relative to the backrest, foldable relative to the backrest, and tiltable relative to the backrest.

4. The passenger seat of claim 1, wherein a width of the backrest is substantially the same as a width of the seat back.

5. The passenger seat of claim 1, wherein the backrest comprises a frame and a cushion supported on the frame.

6. The passenger seat of claim 5, wherein the cushion extends in a vertical direction below the frame of the backrest.

7. The passenger seat of claim 1, wherein the backrest comprises a support surface, wherein, in the stowed position of the backrest, the support surface faces in a forward direction, and wherein, in the deployed position of the backrest, the support surface faces in a lateral direction perpendicular to the forward direction.

8. The passenger seat of claim 1, wherein the headrest is movable relative to the backrest independently from movement of the backrest relative to the seat back.

9. The passenger seat of claim 1, wherein the headrest is movable between a stowed position and a deployed position, wherein, in the stowed position of the headrest, the headrest defines a minimum height of the seat back assembly, and wherein, in the deployed position of the headrest, the headrest defines a maximum height of the seat back assembly.

10. The passenger seat of claim 1, further comprising a privacy panel movable relative to the seat back between a stowed position and a deployed position, and wherein the privacy panel is movable between the stowed position and deployed position of the privacy panel when the backrest is in the deployed position of the backrest.

11. The passenger seat of claim 10, wherein, in the deployed position of the privacy panel, the privacy panel extends forward relative to the seat back.

12. The passenger seat of claim 10, wherein the privacy panel and the backrest are each pivotably attached to the seat back at opposing sides of the seat back.

13. The passenger seat of claim 1, wherein the seat base comprises a first lateral side extending in a forward and aft direction and a second lateral side extending in the forward and aft direction, and wherein, in the deployed position of the backrest, the backrest extends along the first lateral side or the second lateral side.

14. The passenger seat of claim 13, wherein, in the stowed position of the backrest, the backrest extends between the first lateral side and the second lateral side.

15. The passenger seat of claim 13, wherein the headrest is movable between a stowed position and a deployed position when the backrest is in the stowed position of the backrest and when the backrest is in the deployed position of the backrest.

16. A passenger seat comprising:
a seat base comprising a base surface; and
a seat back assembly supported on the seat base, the seat back assembly comprising:
a seat back comprising a first lateral side and a second lateral side, the seat back comprising a first back surface; and
a backrest assembly supported on the seat back and comprising a backrest and a headrest, wherein the backrest is pivotably connected to the first lateral side of the seat back, and wherein the headrest is attached to the backrest and is movable relative to the backrest, wherein the backrest comprises a second back surface,
wherein the backrest is pivotable between a stowed position and a deployed position, wherein, in the stowed position of the backrest, the backrest extends between the first lateral side and the second lateral side, and wherein, in the deployed position of the backrest, the backrest extends in a forward direction relative to the first lateral side or the second lateral side,
wherein, in the stowed position, the base surface and the second back surface are configured to receive a passenger, and
wherein, in the deployed position, the base surface and the first back surface are configured to receive the passenger.

17. A passenger seat comprising:
a seat base; and
a seat back assembly supported on the seat base and pivotable in a forward and aft direction relative to the seat base, the seat back assembly comprising:
a seat back; and
a backrest assembly supported on the seat back such that the seat back supports the backrest assembly on the seat base, the backrest assembly comprising:

a support structure pivotably connected to a lateral side of the seat back;
a backrest supported on the support structure and extending below a lower edge of the support structure; and
a headrest supported on the support structure above the backrest,
wherein the backrest assembly is pivotable relative to the seat back, and
wherein the headrest is movable relative to the support structure.

18. The seat back assembly of claim 17, wherein the backrest assembly further comprises a privacy panel, wherein the privacy panel and the backrest are configured to independently swivel relative to the seat back.

19. The seat back assembly of claim 17, wherein the backrest comprises a frame and a cushion supported on the frame, and wherein the headrest is attached to the frame of the backrest such that the headrest is movable relative to the backrest.

* * * * *